US012771985B2

(12) United States Patent
Aurongzeb et al.

(10) Patent No.: US 12,771,985 B2
(45) Date of Patent: Oct. 20, 2026

(54) SYSTEM AND METHOD OF ASSEMBLING A REPLACEABLE AUDIO DRIVER MODULE FOR INTERCHANGEABLE USE WITH AN AUDIO HEADSET AND A MOBILE SPEAKER DEVICE

(71) Applicant: Dell Products LP, Round Rock, TX (US)

(72) Inventors: Deeder M. Aurongzeb, Austin, TX (US); Peng Lip Goh, Singapore (SG); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 188 days.

(21) Appl. No.: 18/634,285

(22) Filed: Apr. 12, 2024

(65) Prior Publication Data

US 2025/0324186 A1 Oct. 16, 2025

(51) Int. Cl.
*H04R 9/08* (2006.01)
*H01M 50/284* (2021.01)
*H04R 1/10* (2006.01)

(52) U.S. Cl.
CPC ........ *H04R 1/1066* (2013.01); *H01M 50/284* (2021.01); *H04R 1/1041* (2013.01); *H04R 1/105* (2013.01); *H04R 9/08* (2013.01); *H01M 2220/30* (2013.01); *H04R 2201/02* (2013.01)

(58) Field of Classification Search
CPC .... H04R 1/0166; H04R 1/1041; H04R 1/105; H04R 9/08; H04R 2201/02
See application file for complete search history.

(56) References Cited

U.S. PATENT DOCUMENTS

| | | | | |
|---|---|---|---|---|
| 8,050,444 B2 | 11/2011 | Smith | | |
| 9,445,185 B2 | 9/2016 | Brunner | | |
| 11,240,585 B2 | 2/2022 | Terlizzi | | |
| 2014/0177863 A1* | 6/2014 | Parkins | H01Q 7/08 | 343/788 |
| 2015/0139473 A1 | 5/2015 | Jaynes | | |
| 2022/0167077 A1* | 5/2022 | Mosgrove | H04R 1/028 | |
| 2022/0337938 A1 | 10/2022 | Wilker | | |
| 2024/0147106 A1* | 5/2024 | Goh | H04R 1/1008 | |

FOREIGN PATENT DOCUMENTS

EP 3939334 A1 1/2022

* cited by examiner

*Primary Examiner* — Suhan Ni
(74) *Attorney, Agent, or Firm* — Prol Intellectual Property Law, PLLC; H. Kenneth Prol

(57) ABSTRACT

A replaceable audio driver module and accessible battery system for an information handling system audio headset or a mobile speaker device may comprise an audio driver module frame with a magnetic mating strip for operative coupling with an earcup cushion module and magnetic mating mounts for operative coupling with an earcup sound chamber cover or a mobile speaker device bottom cover, an actuator diaphragm operatively coupled across the audio driver module frame and an actuator main printed circuit board (PCB) that is operatively coupled to an audio driver and an audio actuator, a main PCB magnetic power connector operatively coupled with a power PCB and a replaceable battery within the earcup sound chamber cover or the mobile speaker device, and the main PCB magnetic power connector for receiving power from the power PCB and the replaceable battery to operate the audio actuator.

7 Claims, 10 Drawing Sheets

325

325

SYSTEM AND METHOD OF ASSEMBLING A REPLACEABLE AUDIO DRIVER MODULE FOR INTERCHANGEABLE USE WITH AN AUDIO HEADSET AND A MOBILE SPEAKER DEVICE

FIELD OF THE DISCLOSURE

The present disclosure generally relates to assembly of an audio headset with a replaceable audio driver module for use with an information handling system. More specifically, the present disclosure relates to the assembly of a removeable and replaceable audio driver module having simplified access to headset components for upgradeable and interchangeable use with an audio headset and a mobile speaker device that also provides access for removal and replacement of batteries.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices or wireless connectivity to wireless peripheral input/output devices that may also include a wired or wireless audio headset or a mobile speaker device, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
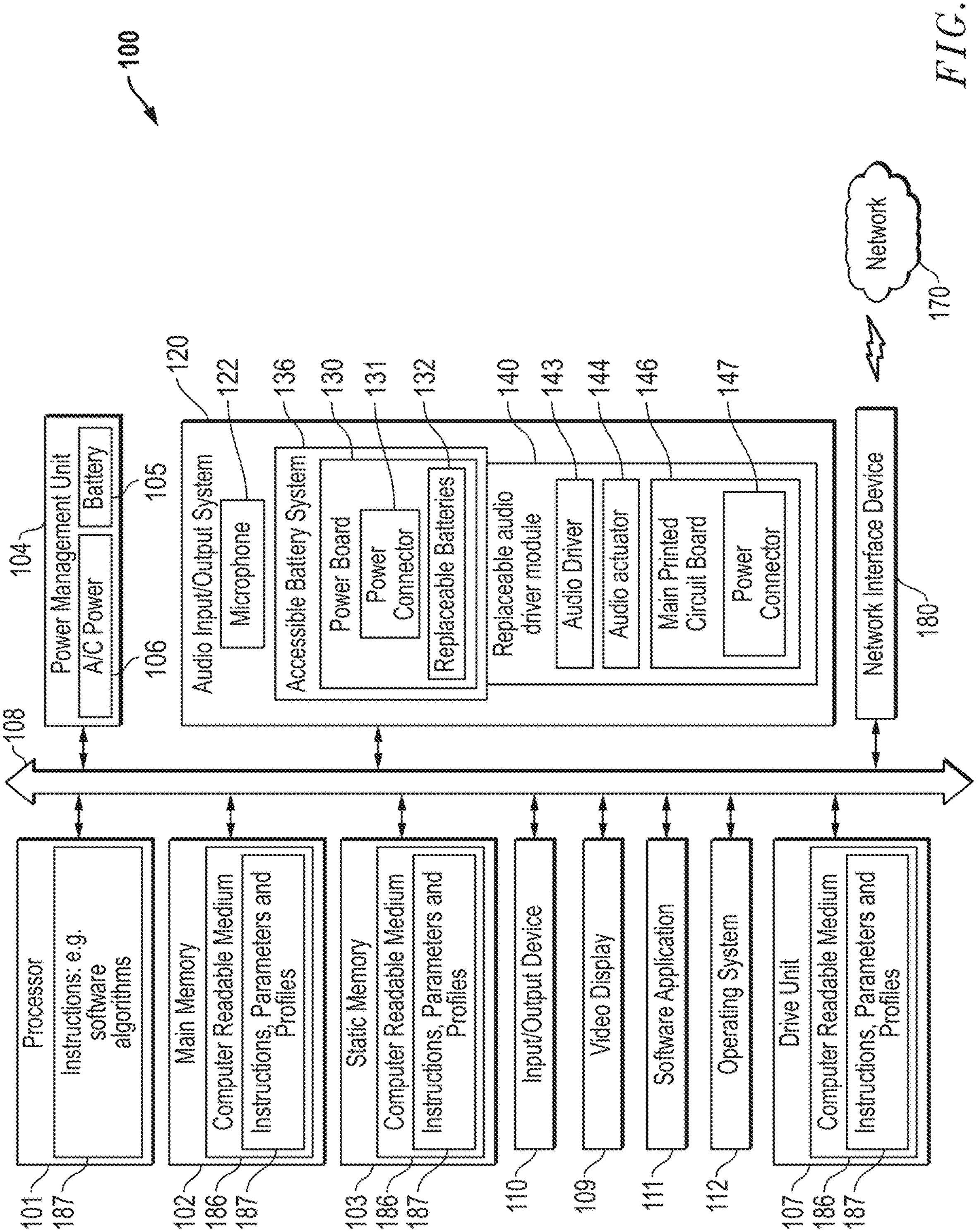
FIG. 1 is a block diagram illustrating an information handling system operatively coupled to a replaceable audio driver module and an accessible battery system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Existing audio headsets such as headphones contain speaker drivers and, in some cases, rechargeable batteries that cannot be easily accessed without damaging the exterior cases of the headset ear cup assemblies. A system is needed that allows for the access, removal, replacement, or upgrading of these components without the high risk of damaging the ear cup assemblies. The replaceable audio driver module and an accessible battery system in embodiments of the present disclosure addresses these issues by providing a method of assembling a replaceable audio driver module and the accessible battery system for interchangeable use with either an audio headset or a mobile speaker device.

The replaceable audio driver module in embodiments of the present disclosure may be assembled for insertion within a detachable and deconstructible earcup assembly that may further allow for simplified access for the replacement of rechargeable batteries. In existing systems, when the audio driver or rechargeable batteries within an audio headset become obsolete or break, often the only solutions are to discard the failed headset and purchase another, creating unnecessary waste or a complicated repair. The same is true for existing mobile or wireless speakers devices. In embodiments of the present disclosure, damaged or outdated audio drivers or rechargeable batteries may be safely and easily removed from the audio headset earcup assembly, which may still contain many still-functioning components, and broken or obsolete components may be replaced for further use with those still-functioning components. This may decrease unnecessary waste. Further, because the replaceable audio driver modules are removeable from the earcup assemblies in embodiments of the present disclosure, they are also capable of being easily swapped into and integrated with a mobile speaker device, which also allows for easy and safe removal and replacement of replaceable batteries and audio drivers. For this reason, the replaceable audio driver module in embodiments herein are interchangeable for use with an audio headset or a mobile speaker device. This may also reduce the cost of producing and providing for an audio headset and mobile speaker device as a set in some embodiments. Further, it may provide for universal replacement of components among both products.

The replaceable audio driver module in embodiments herein may be situated in an earcup assembly for an audio headset by disposing the replaceable audio driver module between an earcup cushion module that rests against the user's head/ear, and an earcup outer cover that encloses a portion of the headband that connects the two earcups of the audio headband. The earcup cushion module, replaceable audio driver module, and earcup outer cover may be easily detachable in embodiments herein. For example, the replaceable audio driver module in embodiments herein may include a frame with a magnetic mating strip on the inner surface for operative coupling with a magnetic mating strip fixed to the earcup cushion assembly to removably attach the replaceable audio driver module to the earcup cushion module and the accessible battery system. As another example, the replaceable audio driver module of embodiments herein may include a plurality of magnetic mating mounts for operative coupling with another plurality of magnetic mating mounts fixed to the inside of the earcup outer cover to removably attach the replaceable audio driver module to the earcup outer cover. These audio driver module magnetic mating mounts may also be capable of operative coupling with another plurality of magnetic mating mounts of a mobile speaker system bottom cover to allow the same replaceable audio driver module that operatively couples with the earcup headset assembly to also operatively couple with a mobile speaker device.

Power may be delivered to the replaceable audio driver module from the accessible battery systems in either an audio headset or a mobile speaker device in embodiments herein. For example, the replaceable audio driver module in embodiments herein may include a main printed circuit board (PCB) that receives power via a main PCB magnetic power connector (e.g., USB-C connector or other magnetic power connection), and supplies power to an incorporated audio actuator and actuator driver of the replaceable audio driver module. In some embodiments, the PCB magnetic power connector for the replaceable audio driver module may operatively couple with a power PCB magnetic power connector (e.g., USB-C connector) of the earcup assembly that is operatively coupled to the accessible battery system and housed within the earcup outer cover. Thus, power from the accessible battery system may be delivered to the power PCB magnetic power connector of the earcup assembly, then to the main PCB magnetic power connector of the replaceable audio driver module, and to the audio actuator and actuator driver. In another example embodiment, the PCB magnetic power connector for the replaceable audio driver module may operatively couple with a power PCB magnetic power connector (e.g., USB-C connector) of the mobile speaker device that is operatively coupled to an accessible battery system and housed within a mobile speaker device body. Thus, power from replaceable batteries within the accessible battery system may be delivered to the power PCB magnetic power connector of the mobile speaker device, then to the main PCB magnetic power connector of the replaceable audio driver module, and to the audio actuator and actuator driver.

As described herein, the replaceable audio driver modules are easily and safely removeable from the earcup assemblies of the audio headset or from the mobile speaker devices, which also allows for easy and safe removal and replacement of replaceable batteries of the accessible battery systems and interchangeable use of the replaceable audio driver modules in both the earcup assemblies and the mobile speaker devices. To easily and safely disassemble an earcup assembly of the audio headset in embodiments herein, the magnetic strip of the earcup cushion module may be detached from the magnetic strip of the replaceable audio driver module, the plurality of magnetic mounts of the replaceable audio driver module may be detached from the plurality of magnetic mounts of the earcup sound chamber housed in the earcup outer cover, and the main PCB magnetic power connector for the audio driver may be detached from the power PCB magnet power connector of the earcup assembly. Removal of the replaceable audio driver module in such a way may leave the replaceable batteries of an accessible battery system disposed between the replaceable audio driver module and the earcup outer cover accessible by a user for replacement.

In another embodiment, to easily and safely disassemble a mobile speaker device in embodiments herein, a magnetic strip of a mobile speaker top cover may be detached from a magnetic strip of a mobile speaker body, the plurality of magnetic mounts of the replaceable audio driver module may be detached from the plurality of magnetic mounts of a mobile speaker bottom cover, and the main PCB magnetic power connector for the audio driver may be detached from the power PCB magnetic power connector of the mobile speaker device. Removal of a plurality of replaceable audio driver modules from within audio driver module openings within the mobile speaker body in such a way may leave replaceable batteries of an accessible battery system disposed beside the power PCB magnetic power connectors of the mobile speaker device accessible by a user for replacement via the audio driver module openings. In such a way, the replaceable audio driver module in embodiments of the present disclosure may be easily and safely removeable from the earcup assemblies of the audio headset or mobile speaker devices, which also allows for easy and safe removal and replacement of replaceable batteries of the accessible battery systems and interchangeable use of the replaceable audio driver modules in both the earcup assemblies and the mobile speaker devices.

FIG. 1 illustrates an information handling system 100 according to several aspects of the present disclosure. In various embodiments described herein, an audio input/output system 120, which may comprise a wired or wireless audio headset or a mobile speaker device may be operatively coupled to the information handling system 100 such that an audio actuator 126 that acts as a speaker emits audible sound generated by the software application 111 or received via streaming or communication with the information handling system 100. The audio input/output system 120 may also include a microphone 122 to receive audio input from a user. As described herein, the audio input/output system 120 in an embodiment may include a replaceable audio driver module

140 and an accessible battery system 136 that may be incorporated within or safely and easily removeable from the audio input/output system 120 for interchangeable use with audio headset input/output systems or mobile speaker devices that comprise the audio input/output system 120.

The replaceable audio driver module 140 in an embodiment may include an audio driver 143, an audio actuator 144 (e.g., piezoelectric actuator, linear resonant actuator, voice coil actuator) acting in tandem with an actuator diaphragm to produce sound, and a main printed circuit board (PCB) 146 for powering the audio driver 143, and the audio actuator 144 via the accessible battery system 136. The main PCB 146 may further include or be operatively coupled to a main PCB power connector 147 for operative coupling with a power connector 131 of a power PCB 130 of the accessible battery system 136 operatively coupled to rechargeable batteries 132 that are housed within either an earcup assembly or a mobile speaker device. The power connector 131 and the main PCB power connector 147 may be of the same standard reciprocal type, but any standard type of power connector may be employed, such as Universal Serial Bus (USB) Types A, B, C, mini-USB, micro-USB, lightning, coaxial, and male and female direct current (DC) adapters. The power connector 131 of the power PCB 130 in the accessible battery system 136 may magnetically couple to the main PCB power connector 147 of the replaceable audio driver module in some embodiments. Power from the replaceable batteries 132 of the accessible battery system 136 may be delivered to the power PCB magnetic power connector 131 via power board PCB 130 of the accessible battery system 136, then to the main PCB magnetic power connector 147 of the replaceable audio driver module 140, and to the audio actuator 144 and actuator driver 143. In some embodiments, the audio input/output system 120 may be part of a wired audio headset or a wired mobile speaker device that is operatively coupled to the information handling system 100 via a wired connection, such as a universal serial bus (USB) connection of network interface device 180 or other port hardware. In other embodiments, the audio input/output system 120 may be part of a wireless audio headset or wireless mobile speaker device that is operatively coupled to the information handling system 100 via a wireless link established through the network interface device 180 having a wireless adapter.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices, such as static memory 103 or drive unit 107, a wireless network interface device 180, various input and output (I/O) devices 110, an audio input/output system 120, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 180, a static memory 103 or drive unit 107, a video display 109, audio input/output system 120, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The network interface device 180 may provide connectivity of the information handling system 100 to wired or wireless peripheral devices such as the audio input/output system 120 or to the network 170 via a network access point (AP) in an embodiment. The network interface device 180 may include wired port hardware in an embodiment. Network interface device 180 may be a wireless adapter in embodiments herein with a radio, radio frequency (RF) front end, antenna and other components. The network interface device 180 may be wirelessly coupled to the audio input/output system 120, such as a wireless headset or wireless mobile speaker device, via Bluetooth® or Bluetooth® Low Energy (BLE) wireless link in embodiments herein. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 180 may operate two or more wireless links. In other aspects of the present disclosure, the information handling system 100 may include a plurality of network interface devices, each capable of establishing a separate wired or wireless links to network 170 or to peripheral devices such as 110 or 120, such that the information handling system 100 may be in communication with network 170 or peripheral devices such as 110 or 120 via a plurality of wired or wireless links.

The network interface device 180 may operate in accordance with any cellular wireless data communication standards in some embodiments. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100. Application instructions 187 may include software that includes communication software or other software such as gaming or streaming software that includes audio interfaces aspects for use with audio input/output system 120.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
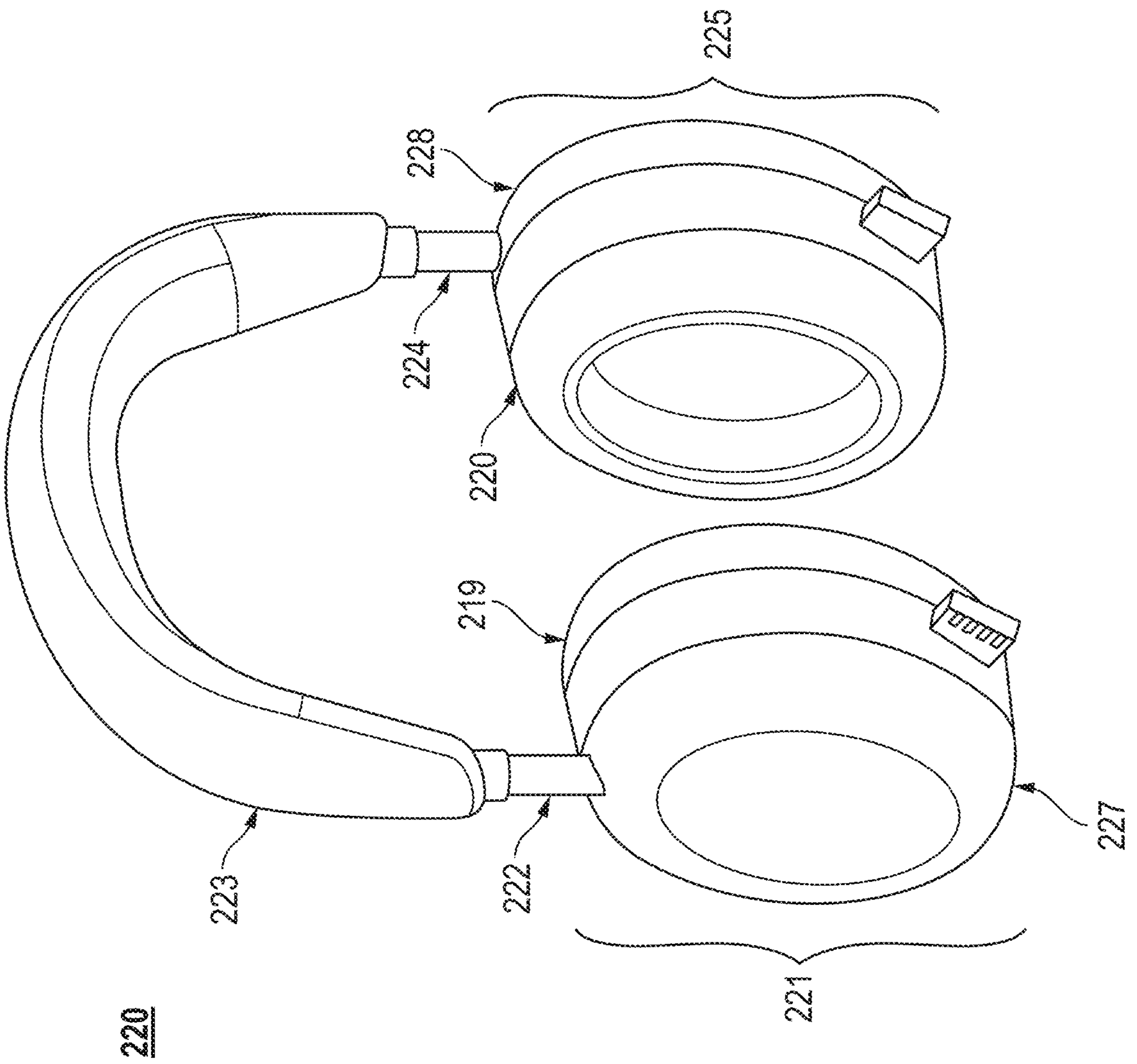
FIG. 2 is a graphical diagram illustrating a perspective view of an audio headset incorporating a replaceable audio driver module and an accessible battery system according to an embodiment of the present disclosure.

FIG. 2 is a graphical diagram illustrating a perspective view of an audio headset as the audio input/output system incorporating plural replaceable audio driver modules and at least one accessible battery system housed within each of the earcup assemblies operatively coupled via a headband according to an embodiment of the present disclosure. The audio headset 220 in an embodiment may include a first earcup assembly 221, a first headband connector post 222, a headband 223, a second headband connector post 224, and a second earcup assembly 225. A replaceable audio driver module and replaceable batteries of an accessible battery system may be housed within each of the first and second earcup assemblies 221 and 225, respectively. At least one accessible battery system with replaceable batteries may be housed within at least one of the first or second earcup assemblies 221 and 225 although both the first and second earcup assemblies 221 and 225 may have an accessible battery system in some embodiments.

A replaceable audio driver module and replaceable batteries of an accessible battery system may be housed within each of the first and second earcup assemblies 221 and 225, respectively. The replaceable audio driver module may be operatively coupled to a sound chamber cover and a first earcup cushion module 219 within an outer earcup cover 227 in an embodiment to form a first earcup assembly 221. The replaceable audio driver module may be operatively coupled to a sound chamber cover and a second earcup cushion module 220 within an outer earcup cover 228 in an embodiment to form a second earcup assembly 225. Each of the sound chamber covers within the first and second earcup assemblies 221 and 225 may be disposed within an earcup outer cover, as described in greater detail below with respect to FIGS. 3A and 3B to form earcup outer cover modules in an embodiment. Each of the sound chamber covers within first and second earcup assemblies 221 and 225 in an embodiment may be operatively coupled to a headband connector posts 222 and 224, respectively. The first earcup assembly 221 may be operatively coupled to the second ear cup assembly 225 in an embodiment, via the headband 223, to form the audio headset 220.

Figure 3A:
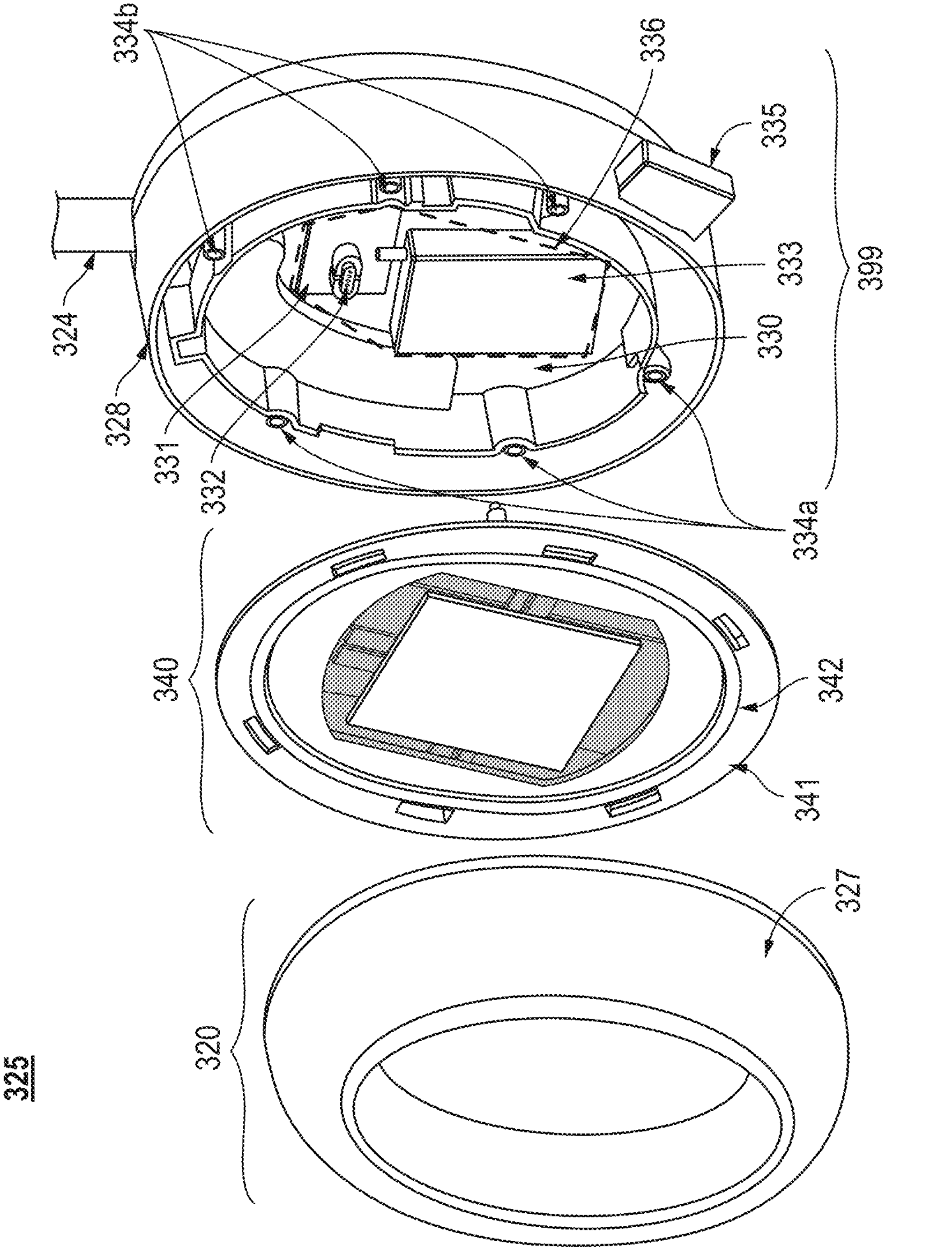
FIG. 3A is a graphical diagram illustrating a front perspective exploded view of an earcup assembly housing a replaceable audio driver module and an accessible battery system according to an embodiment of the present disclosure.

FIG. 3A is a graphical diagram illustrating a front perspective exploded view of an earcup assembly 325 housing an audio driver a replaceable audio driver module and replaceable batteries of an accessible battery system according to an embodiment of the present disclosure. A sound chamber cover 330 may be formed in an embodiment having magnetic mating mounts 334*a* and 334*b* fixed to an inner surface of the sound chamber cover 330 for operative coupling with the plurality of magnetic mating mounts of the replaceable audio driver module 340, as described in greater detail below with respect to FIG. 4B.

A power PCB 331 is operatively coupled in an embodiment to a replaceable battery 333 and to a power PCB magnetic power connector 332 of an accessible battery system 336 in the audio headset. Power PCB magnetic power connector 332 magnetically couples with the main PCB magnetic power connector (not shown) of the replaceable audio driver module 340. The replaceable battery 333 is accessible by a user for removal or replacement by detaching the replaceable audio driver module 340 from the earcup sound chamber cover 330 to expose the replaceable battery 333. This may be achieved by separating the plurality of magnetic mating mounts 334*a* and 334*b* from the detachably operatively coupled magnetic mating mounts of the replaceable audio driver module 340 described in greater detail below with respect to FIG. 4B. Multiple replaceable batteries of an accessible battery system, such as 333 may be housed within the earcup sound chamber cover 330 in some embodiments. The replaceable battery 333 may provide power to the power PCB 331 of an accessible battery system 336 in the audio headset in an embodiment. The power PCB magnetic power connector 332 may receive power from the power PCB 331 of an accessible battery system 336 in the audio headset and deliver such power to the replaceable audio driver module 340 via the power connector of the replaceable audio driver module 340 described in greater detail below with respect to FIG. 4B.

The power PCB 331, magnetic power connector 332, and replaceable battery 333 of the accessible battery system 336 of the audio headset in an embodiment may be disposed within the sound chamber cover 330. The sound chamber cover 330 may be disposed within an earcup outer cover 328 to form an earcup outer cover module 399 in an embodiment. The replaceable battery 333 of the accessible battery system 336 may be operatively coupled to a charging connector 335 with charging contact pins mounted on the earcup outer cover 328 in embodiments herein. The sound chamber cover 330 in an embodiment may be operatively coupled to a headband connector post 324.

An audio driver module frame 341 for a replaceable audio driver module 340 may be formed for interchangeable operative coupling with an earcup cushion module 320 and either an earcup sound chamber cover 330 for an audio headset (e.g., 220 of FIG. 2) or a mobile speaker device bottom cover, as described in greater detail below with respect to FIG. 5B in an embodiment. The audio driver module frame 341 in an embodiment may include a plurality of magnetic mating mounts, as described in greater detail with respect to FIG. 4B, for operative coupling with a plurality of magnetic mating mounts 334*a* and 334*b* of an earcup sound chamber cover 330 or a mobile speaker device bottom cover, as described in greater detail with respect to FIG. 5B, below. Each of the magnetic mating mounts 334*a* and 334*b* in an embodiment may include magnets of a first polarity, a magnetic mineral, or of a first magnetic material such as steel for magnetically and detachably coupling to a plurality of magnetic mating mounts within the audio driver module frame, as described in greater detail with respect to FIG. 4B below.

The replaceable audio driver module 340 in an embodiment may include a main PCB magnetic power connector, as described in greater detail with respect to FIG. 4B below, for operative coupling with a magnetic power connector 332 of a power PCB 331 of the accessible battery system 336 in an earcup sound chamber cover 330 or for operative coupling with a magnetic power connector of a mobile speaker device, as described in greater detail below with respect to FIG. 5B. The magnetic power connector 332 in an embodiment may be a power connector for any of a plurality of known or later-developed standards, including Universal Serial Bus (USB) Types A, B, C, mini-USB, micro-USB, lightning, coaxial, and male and female direct current (DC) adapters. It is contemplated that the magnetic power connector 332 in an embodiment may conform to any of these standards, so long as the magnetic power connector for the replaceable audio driver module 340 also adheres to the same standard for operative coupling with the magnetic power connector 332 to deliver power from the replaceable batteries 333 to the magnetic power connector of the replaceable audio driver module 340, as described in greater detail with respect to FIG. 4B.

An earcup cushion module 320 may be formed in an embodiment by fixing an earcup cushion 327 to an earcup cushion module mating collar (not shown), as described in greater detail with respect to FIG. 4B, below. The replaceable audio driver module 340 may be operatively coupled to the sound chamber cover 330 and earcup cushion module 320 in an embodiment to form a first earcup assembly 325. The replaceable audio driver module 340 in an embodiment may include a magnetic mating strip 342 fixed to an inner surface 341, as described further with respect to FIG. 4A, for operative coupling with a magnetic mating strip (not shown) of the earcup cushion module 320. The audio driver module magnetic mounts may detachably and operatively couple, via magnetic coupling for example, with the earcup sound chamber cover magnetic mounts 334*a* and 334*b* in an embodiment.

Figure 3B:
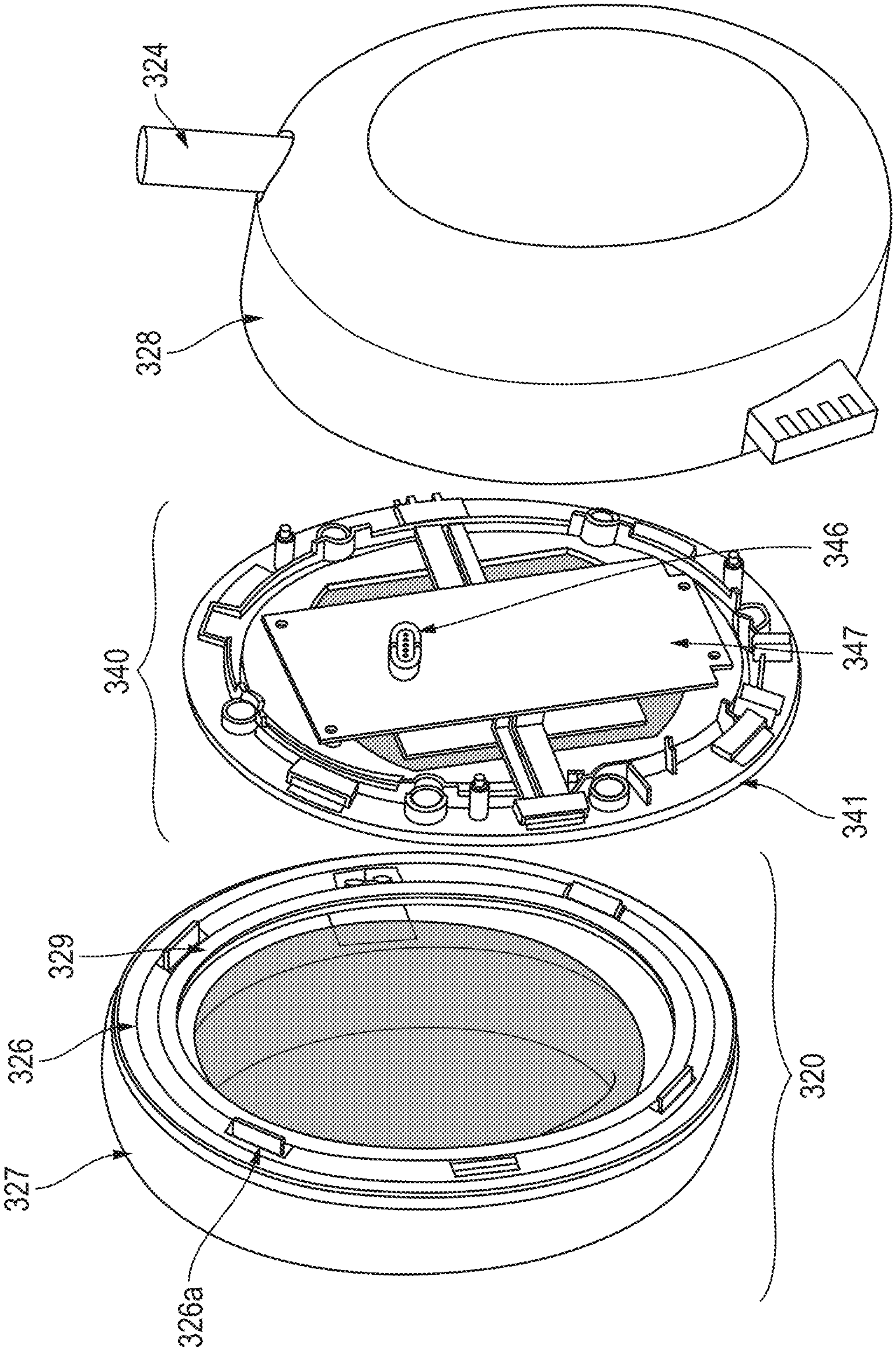
FIG. 3B is a graphical diagram illustrating a rear perspective exploded view of an earcup assembly housing a replaceable audio driver module and an accessible battery system according to an embodiment of the present disclosure.

FIG. 3B is a graphical diagram illustrating a rear perspective exploded view of an earcup assembly housing an audio driver module of a replaceable audio driver module and replaceable batteries of an accessible battery system according to an embodiment of the present disclosure. The earcup cushion module 320 may be formed in an embodiment by fixing an earcup cushion 327 to an earcup cushion module mating collar 326 having the magnetic mating strip 329 for operative coupling with the magnetic mating strip fixed to the audio driver module frame 320. The replaceable audio driver module 340 in an embodiment may include a magnetic mating strip 342 fixed to an inner surface 341, as described further with respect to FIG. 4A, for operative coupling with the magnetic mating strip 329 of the earcup cushion module 320. The replaceable audio driver module 340 may be operatively coupled to the sound chamber cover disposed within the outer earcup cover 328 and earcup cushion module 320 in an embodiment to form a first earcup assembly 325. The audio driver module magnetic strips (342 in FIG. 3A) and described in greater detail below with respect to FIG. 4A may detachably and magnetically operatively couple with the earcup cushion module 320 magnetic strip 329 in an embodiment.

The mating collar 327 of the earcup cushion module 320 may detachably and operatively couple with a plurality of collar openings in the replaceable audio driver module 340 as described in greater detail below with respect to FIG. 4A in an embodiment. For example, the mating collar 327 may include a plurality of deformable tabs 327*a*, such as plastic tabs that may each insert within a collar opening of the replaceable audio driver module 340 described in greater detail below with respect to FIG. 4A. Upon insertion of each of the tabs 337*a* within the openings in the replaceable audio driver module 340, the tabs may lock into place to hold the replaceable audio driver module 340 in contact with the earcup cushion module 320. In order to detach the replaceable audio driver module 340 from the earcup cushion module 320 in an embodiment, the user may detach the earcup outer cover assembly 399 from the replaceable audio driver module 340 and deform the collar tabs 337*a* such that they may pass through the openings of the replaceable audio driver module 340. The user may then detach the magnetic strip 329 from the audio driver module magnetic strip (342 in FIG. 3A) described in greater detail with respect to FIG. 4A.

Figure 4A:
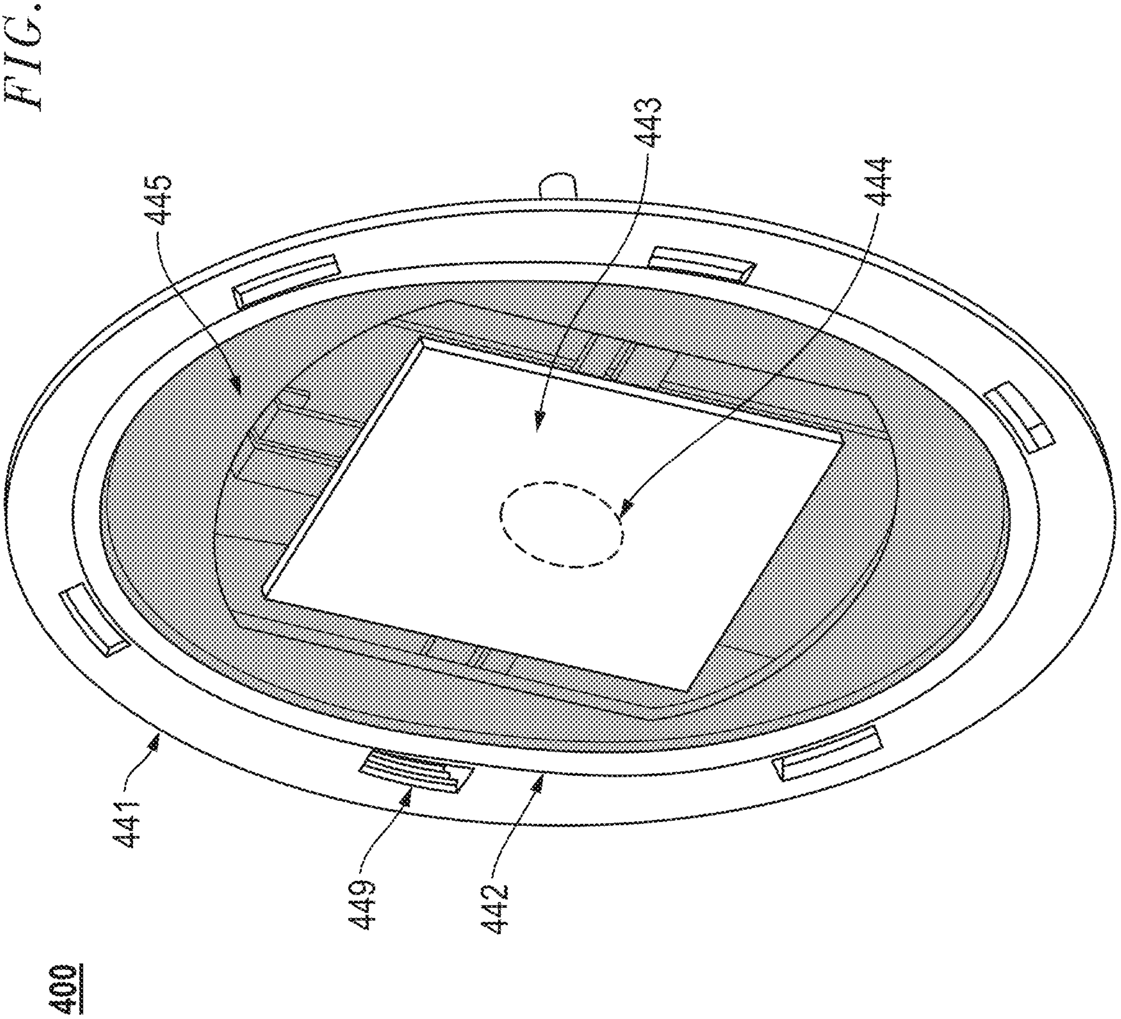
FIG. 4A is a graphical diagram illustrating a front perspective view of a replaceable audio driver module according to an embodiment of the present disclosure.

FIG. 4A is a graphical diagram illustrating a front perspective view of an audio driver of a replaceable audio driver module according to an embodiment of the present disclosure. An audio driver module frame 441 for a replaceable audio driver module 440 may be formed for interchangeable operative coupling with an earcup cushion module and either an earcup sound chamber cover for an audio headset, as described above with respect to FIGS. 3A and 3B, or a mobile speaker device bottom cover, as described in greater detail below with respect to FIGS. 5A and 5B in an embodiment. The audio driver module frame 441 in an embodiment may include a magnetic mating strip 442 fixed to an inner surface for operative coupling with a magnetic mating strip of an earcup cushion module, such as 329 of FIG. 3B.

An audio driver 443 may be operatively coupled in an embodiment to an audio actuator 444. The audio actuator 444 of the replaceable audio driver module 440 may convert received electrical signals into audible sound via a mechanism such as a piezo material, such as a piezoelectric ceramic disk, and the actuator diaphragm 445 may amplify such audible sound of the audio driver 443 within the audio driver module frame 441. The audio actuator 444 and actuator diaphragm 445 may be disposed between an audio main PCB (not shown but described in greater detail below with respect to FIG. 4B) and the audio driver 443 in an embodiment. The replaceable audio driver module 440 may be operatively coupled to a sound chamber cover (330 of FIG. 3A) and earcup cushion module (320 of FIG. 3A) in an embodiment to form a first earcup assembly (221 of FIG. 2). The audio driver module magnetic strip 442 may detachably and operatively couple, such as with a magnetic operative coupling, with the earcup cushion module magnetic strip (329 in FIG. 3B) in an embodiment. A mating collar (327 of FIG. 3B) of the earcup cushion module (320 of FIG. 3B) may detachably and operatively couple with a plurality of collar openings 449 in the replaceable audio driver module 440 in an embodiment.

Figure 4B:
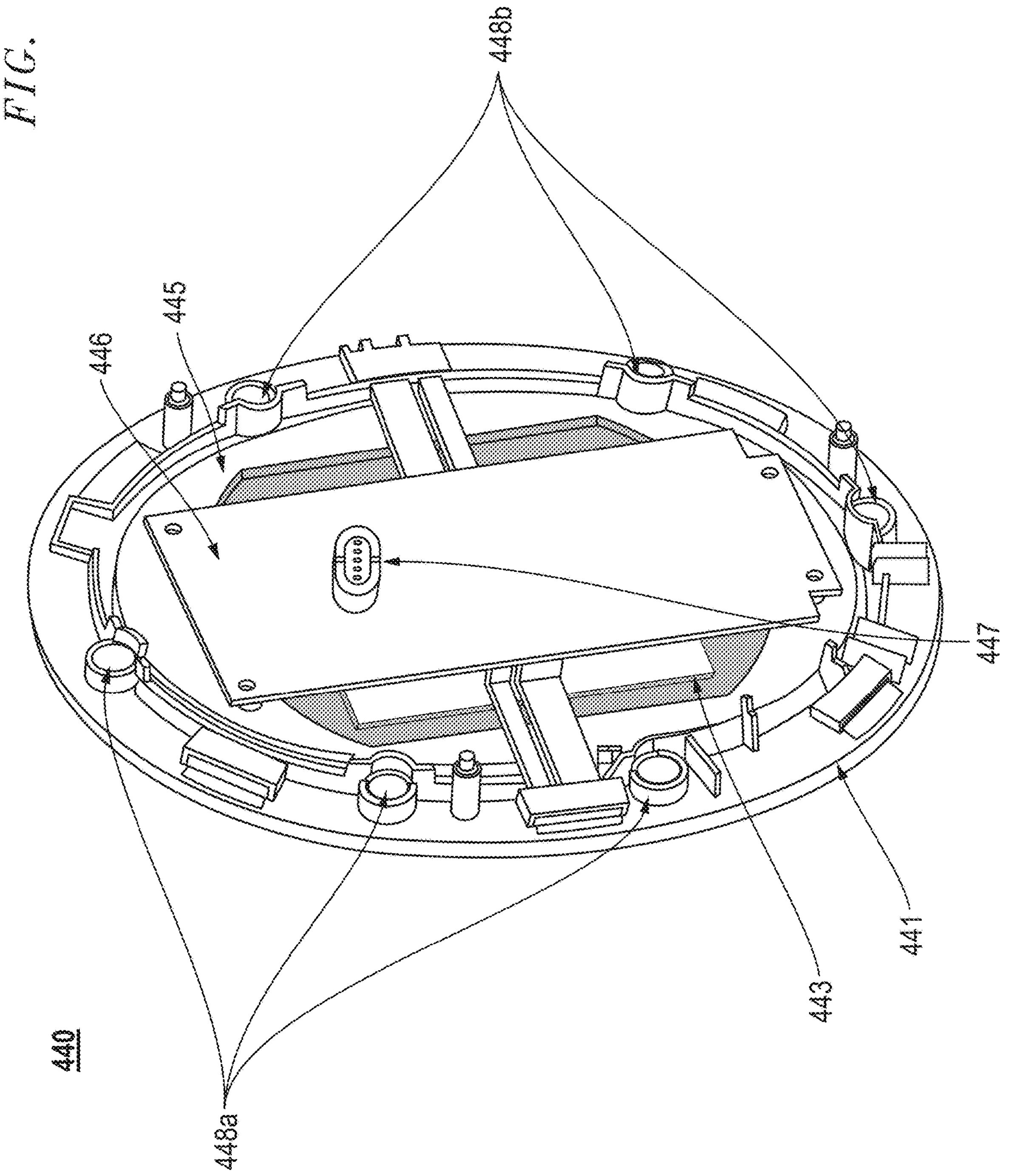
FIG. 4B is a graphical diagram illustrating a rear perspective view of a replaceable audio driver module according to an embodiment of the present disclosure.

FIG. 4B is a graphical diagram illustrating a rear perspective view of an audio driver frame of a replaceable audio driver module according to an embodiment of the present disclosure. An audio driver module frame 441 for a replaceable audio driver module 440 may be formed for interchangeable and operative coupling with an earcup cushion module (320 of FIG. 3A) and either an earcup sound chamber cover (330 of FIG. 3A) for an audio headset or a mobile speaker device bottom cover, as described in greater detail below with respect to FIGS. 5A and 5B in an embodiment. The audio driver module frame 441 in an embodiment may include a plurality of magnetic mating mounts 448*a* and 448*b* fixed to the outer surface for operative coupling with a plurality of magnetic mating mounts (334*a* and 334*b* of FIG. 3A) of an earcup sound chamber cover (330 of FIG. 3A) or a mobile speaker device bottom cover, as described in greater detail below with respect to FIG. 5B. Each of the magnetic mating mounts 448*a* and 448*b* in an embodiment may include magnets of a first polarity, a magnetic mineral, or a ferromagnetic material for magnetically and detachably coupling to a plurality of magnetic mating mounts of the sound chamber cover (330 of FIG. A) or the speaker module bottom cover, as described in greater detail below with respect to FIG. 5B.

An audio driver 443 may be operatively coupled in an embodiment to an audio actuator (444 of FIG. 4A) and to an actuator main printed circuit board (PCB) 446 having a main PCB magnetic power connector 447 for operative coupling with a magnetic power connector (332 of FIG. 3A) of a power PCB (e.g., 331 of FIG. 3A) in either an earcup sound chamber cover (330 of FIG. 3A) or a mobile speaker device, as described in greater detail below with respect to FIG. 5B. The audio actuator (444 of FIG. 4A) and the actuator diaphragm 445 may be disposed between the audio main PCB 446 and the audio driver 443 in an embodiment. The audio main PCB 446 may be mounted to the audio driver module frame 441 outer surface in an embodiment.

A power PCB (331 of FIG. 3A) of an audio headset may be operatively coupled in an embodiment to a power PCB magnetic power connector (332 of FIG. 3A) for operative coupling with the main PCB 446 magnetic power connector 447 of the replaceable audio driver module 440. The magnetic power connector 447 in an embodiment may be any power connector and may be from any of a plurality of known or later-developed standards, including Universal Serial Bus (USB) Types A, B, C, mini-USB, micro-USB, lightning, coaxial, and male and female direct current (DC) adapters. It is contemplated that the magnetic power connector 447 in an embodiment may conform to any of these standards or other type of power connector, so long as the magnetic power connector 447 for the replaceable audio driver module 440 also adheres to the same standard for operative coupling with the magnetic power connector (332 of FIG. 3A) for the earcup assembly power PCB (330 of FIG. 3A) to deliver power from the replaceable batteries (333 of FIG. 3A) to the magnetic power connector 447 of the replaceable audio driver module 440. The replaceable audio driver module 440 may be operatively coupled to the sound chamber cover (330 of FIG. 3A) and earcup cushion module (320 of FIG. 3A) in an embodiment to form a first earcup assembly (221 of FIG. 2). The replaceable audio driver module 440 magnetic mounts 448*a* and 448*b* may detachably and magnetically operatively couple with the earcup sound chamber cover magnetic mounts (334*a* and 334*b* of FIG. 3A) in an embodiment.

In another embodiment, power printed circuit board (PCB) of the mobile speaker device described in greater detail below with respect to FIG. 5B may be operatively coupled to a power PCB magnetic power connector for operative coupling with a magnetic power connector 447 of the replaceable audio driver module 440. The magnetic power connector 447 is also of a power connector type to operatively couple with the magnetic power connector for the mobile speaker system to deliver power from the replaceable batteries of the mobile speaker system to the magnetic power connector 447 and the replaceable audio driver module 440. A mobile speaker bottom cover described in greater detail below with respect to FIG. 5B may be formed in an embodiment to include a plurality of magnetic mating mounts for operative coupling with a plurality of magnetic mating mounts 448*a* and 448*b* of the replaceable audio driver module 440.

Figure 5A:
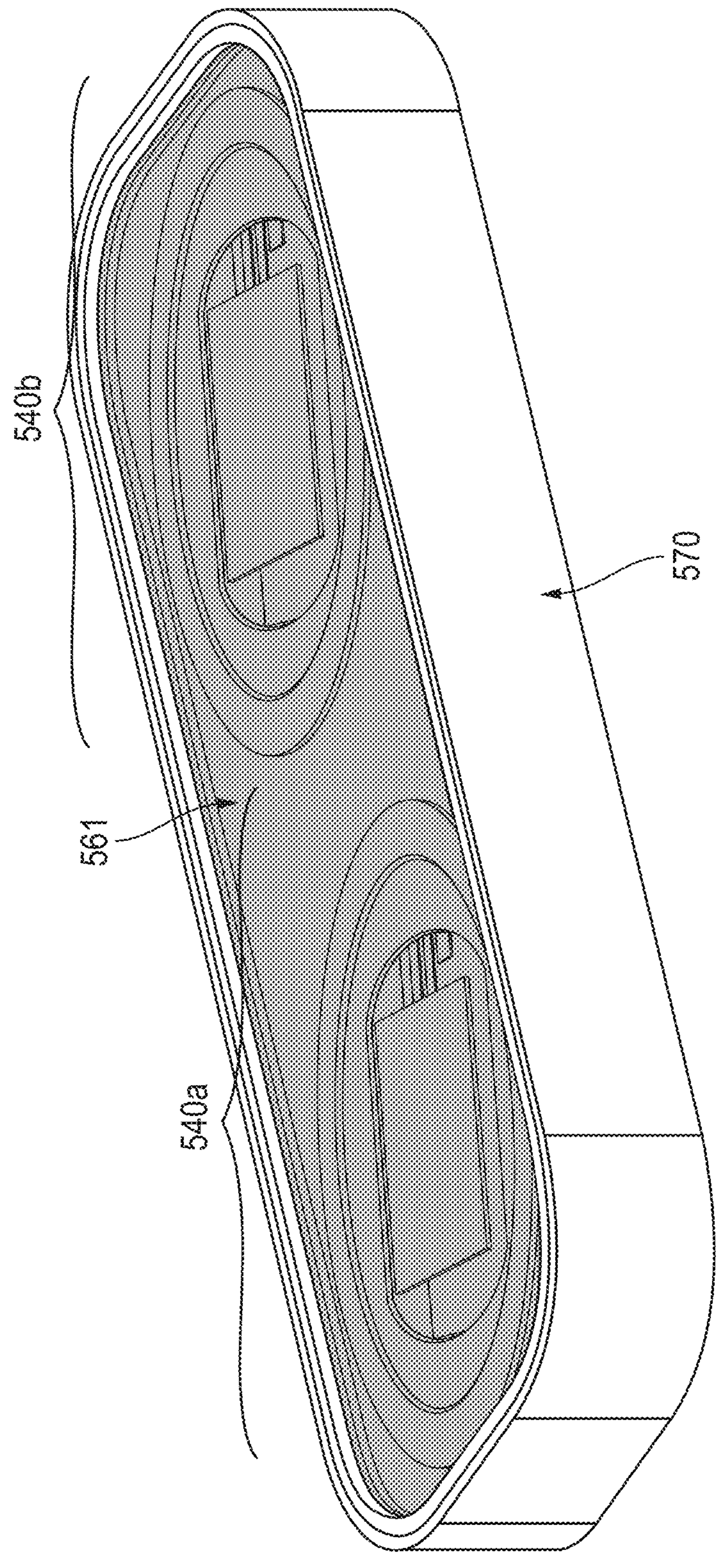
FIG. 5A is a graphical diagram illustrating a top perspective view of a mobile audio speaker device incorporating a replaceable audio driver module and an accessible battery system according to an embodiment of the present disclosure.

FIG. 5A is a graphical diagram illustrating a top perspective view of a mobile audio speaker device incorporating a replaceable audio driver module and an accessible battery system that is also interchangeable with an audio headset assembly according to an embodiment of the present disclosure. As described herein, the replaceable audio driver modules 540*a* and 540*b* in an embodiment are easily and safely removeable from the earcup assemblies or mobile speaker device 550, which also allows for easy and safe removal and replacement of replaceable batteries and interchangeable use of the replaceable audio driver modules 540*a* and 540*b* in both the earcup assemblies and the mobile speaker device 550. FIG. 5A describes incorporation of the replaceable audio driver modules 540*a* and 540*b* within a mobile audio speaker device 550 in an embodiment.

A mobile speaker body 570 for a mobile speaker device 550 may be formed in an embodiment for enclosing one or more replaceable audio driver modules 540*a* and 540*b*. A mobile speaker top cover 561 may be formed as a mesh, fabric, or other top cover material on a frame to permit audio sounds to pass through in embodiments herein. A frame of mobile speaker top cover 561 in an embodiment may include a magnetic mating strip (not shown but described in greater detail with respect to FIG. 5B) on a bottom surface for operative coupling with the mobile speaker body 570. One of a plurality of replaceable audio driver modules 540*a* and 540*b* in an embodiment may be inserted into each audio driver module opening (not shown, but described in greater detail with respect to FIG. 5B) within the mobile speaker body 570. The mobile speaker top cover 561 in an embodiment may be disposed on top of the replaceable audio driver module(s) 540*a* and 540*b* and the mobile speaker body 570 to enclose the replaceable audio driver modules 540*a* and 540*b* within the mobile speaker device 550.

Figure 5B:
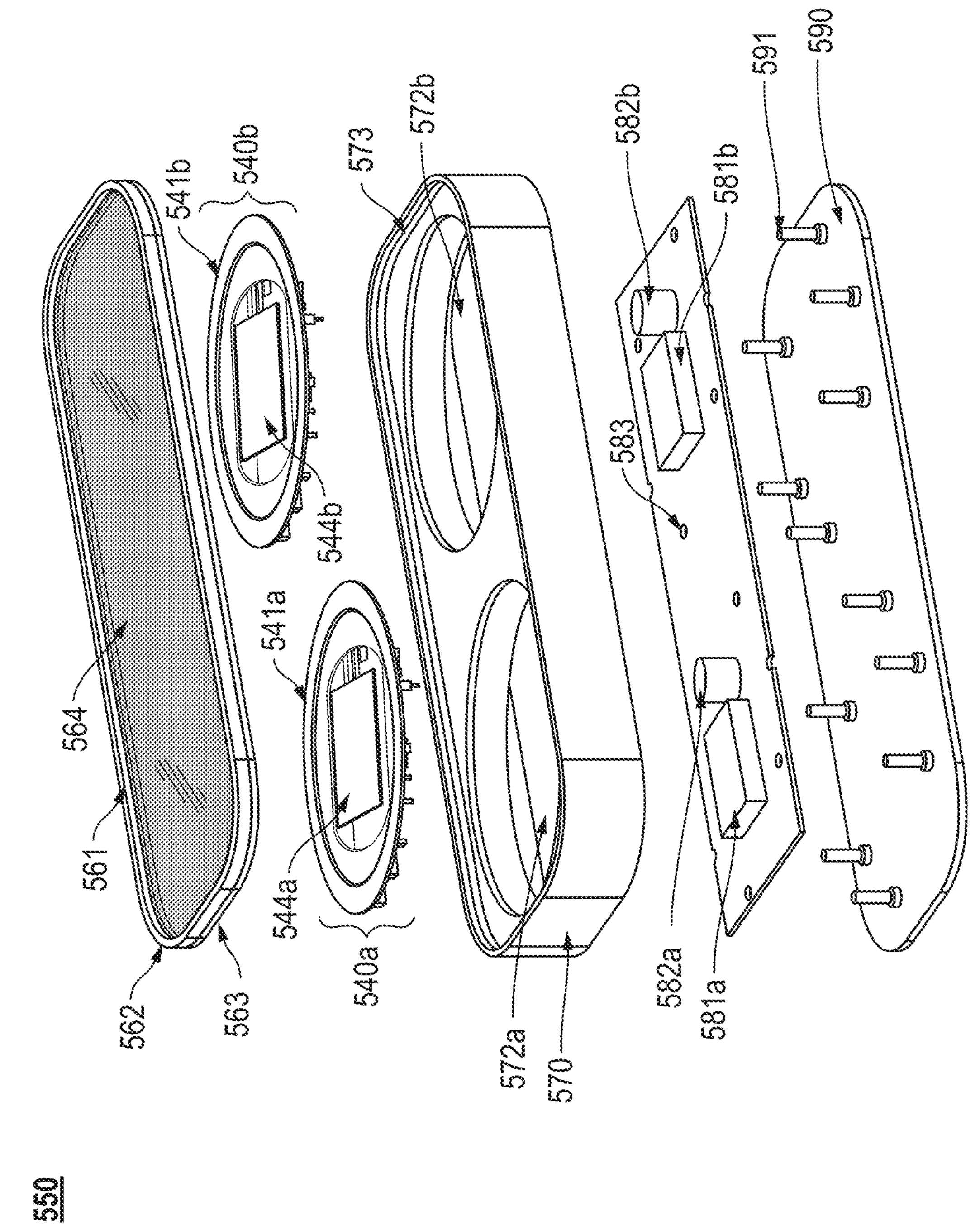
FIG. 5B is a graphical diagram illustrating an exploded perspective view of a mobile audio speaker device incorporating a replaceable audio driver module and an accessible battery system according to an embodiment of the present disclosure.

FIG. 5B is a graphical diagram illustrating an exploded perspective view of a mobile audio speaker device incorporating a replaceable audio driver module and an accessible battery system that is also interchangeable with an audio headset assembly according to an embodiment of the present disclosure. An audio driver module frame 541*a* or 541*b* for a replaceable audio driver module 540*a* or 540*b*, respectively, may be formed for interchangeable and operative coupling with either an earcup cushion module (320 of FIG. 3A) and earcup sound chamber cover (330 of FIG. 3A) for an audio headset or a mobile speaker device bottom cover 590 in an embodiment. The audio driver module frame 541*a* or 541*b* in an embodiment may include a plurality of magnetic mating mounts (448*a* and 448*b* of FIG. 4B) fixed to the outer surface of the audio driver module frame 541*a* or 541*b* for operative coupling with a plurality of magnetic mating mounts 591 of a mobile speaker device 550 bottom cover 590. Each of the magnetic mating mounts 591 in an embodiment may include magnets of a first polarity, a magnetic mineral, or ferromagnetic material for magnetically and detachably coupling to a plurality of magnetic mating mounts (448*a* and 448*b* of FIG. 4B) fixed to the replaceable audio driver module 540*a* or 540*b*. An audio driver (443 of FIG. 4A) may be operatively coupled in an embodiment to an audio actuator 544*a* or 544*b* and to an actuator main printed circuit board (PCB) (446 of FIG. 4B) having a main PCB magnetic power connector (447 of FIG. 4B) for operative coupling with a magnetic power connector 582*a* or 582*b* of a power PCB 583 in a mobile speaker device 550.

A mobile speaker body 570 for a mobile speaker device 550 may be formed in an embodiment to include an audio driver module opening 572*a* or 572*b* and a magnetic mating strip 573 for operative coupling with a magnetic mating strip 563 of a mobile speaker top cover 561. A mobile speaker top cover 561 may be formed with a frame 562 in an embodiment to include a magnetic mating strip 563 on a bottom surface of the frame 562 for operative coupling with the mobile speaker body 570. A speaker top cover material 564 may be disposed across the frame 562 of the mobile speaker top cover 561 and may allow sound to pass in an example embodiment. The speaker top cover material 564 may be a plastic or rubber mesh, a fabric material, a foam material, or other suitable material to allow sound to pass through in various embodiments. A power printed circuit board (PCB) 583 of the mobile speaker device 550 may be operatively coupled to a replaceable battery 581*a* or 581*b* and to a power PCB magnetic power connector 582*a* or 582*b* for operative coupling with a magnetic power connector (447 of FIG. 4B) of the replaceable audio driver module 540*a* or 540*b*. The magnetic power connector 582*a* or 582*b* in an embodiment may be a power connector of any type including for any of a plurality of known or later-developed standards, including Universal Serial Bus (USB) Types A, B, C, mini-USB, micro-USB, lightning, coaxial, and male and female direct current (DC) adapters. It is contemplated that the magnetic power connector 582*a* or 582*b* in an embodiment may be any type or conform to any of these standards, so long as the magnetic power connector for the replaceable audio driver module 540*a* or 540*b* also adheres to the same standard for operative coupling with the magnetic power connector 582*a* or 582*b* for the mobile speaker device 550 to deliver power from the replaceable batteries 581*a* or 581*b* to the magnetic power connector 582*a* or 582*b*. A mobile speaker bottom cover 590 may be formed in an embodiment to include a plurality of magnetic mating mounts 591 for operative coupling with a plurality of magnetic mating mounts (448*a* or 448*b* of FIG. 4B) of the replaceable audio driver module 540*a* or 540*b*.

The power PCB 583, replaceable batteries 581*a* and 581*b*, and power PCB magnetic power connectors 582*a* and 582*b* may be disposed above the mobile speaker bottom cover 590 and within the mobile speaker body 570 such that the magnetic mating mounts 591, replaceable batteries 581*a* and 581*b* and power PCB magnetic power connectors 582*a* and 582*b* are accessible via the audio driver module openings 571*a* and 571*b*, respectively. One of a plurality of replaceable audio driver modules 540*a* and 540*b* in an embodiment may be inserted into each audio driver module opening 572*a* and 572*b*, respectively, within the mobile speaker body 570. The replaceable audio driver module(s) 540*a* and 540*b* may be inserted in an embodiment such that the power PCB magnetic power connectors 582*a* and 582*b* operatively couple with the main PCB magnetic power connectors (e.g., 447 of FIG. 4B) of the replaceable audio driver modules 540*a* and 540*b*, respectively, and the plurality of magnetic mating mounts 591 from the bottom cover 590 operatively couple with the plurality of magnet mating mounts (e.g. 448*a* and 448*b* of FIG. 4B) of the replaceable audio driver modules 540*a* and 540*b*. The mobile speaker top cover 561 in an embodiment may be disposed on top of the replaceable audio driver module(s) 540*a* and 540*b* and the mobile speaker body 570 such that the magnetic mating strip 563 on the frame of the mobile speaker top cover 561 operatively couples with the magnetic mating strip 573 of the mobile speaker body 570 to enclose the replaceable audio driver modules 540*a* and 540*b* within the mobile speaker device 570. The mobile speaker top cover 561 may include the speaker top cover frame 562 with a mesh material, textile, grid, or other form disposed across the speaker top cover frame 562 to allow audio from the replaceable audio driver modules 540*a* and 540*b* to pass through according to embodiments herein.

Figure 6:
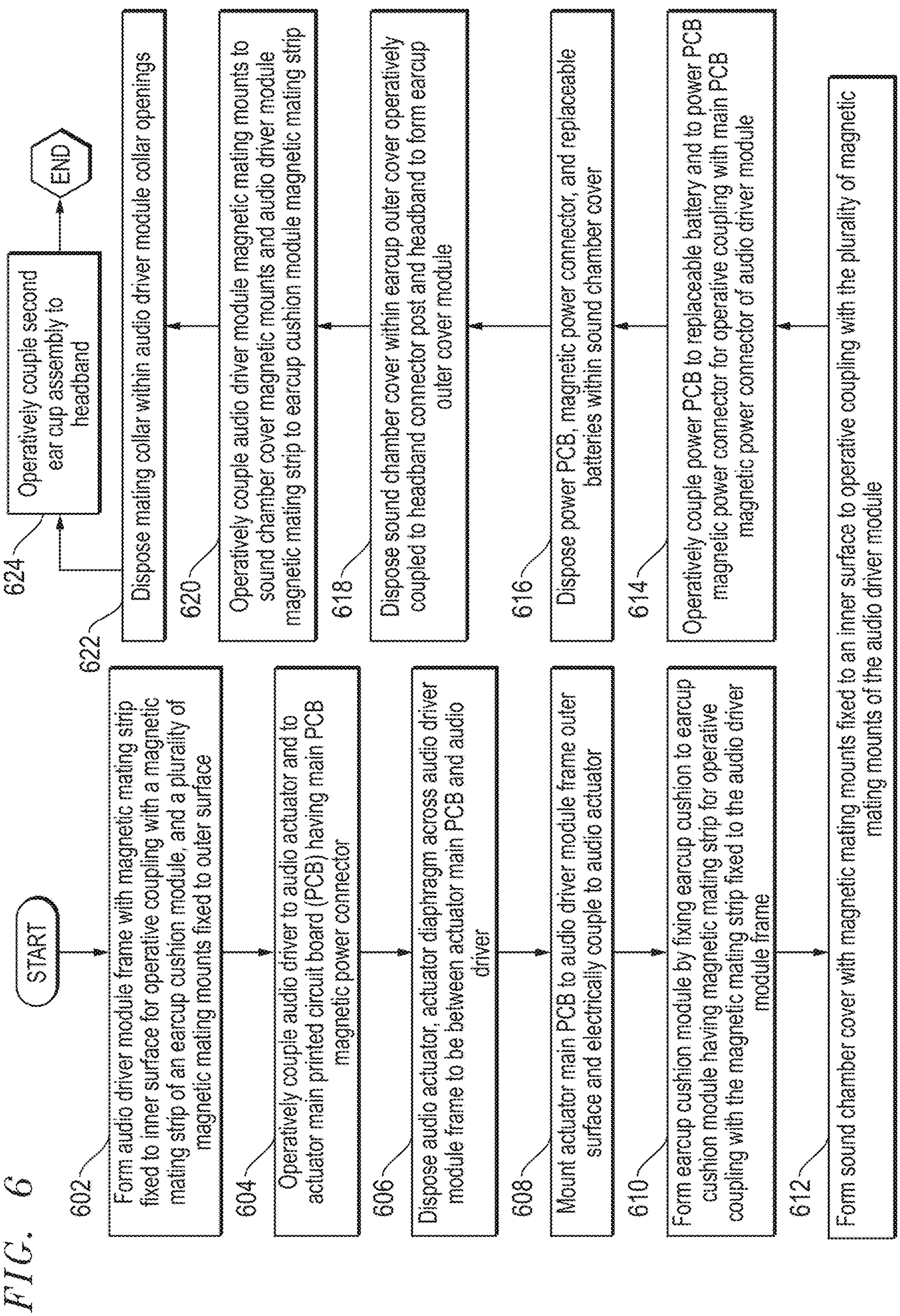
FIG. 6 is a flow diagram illustrating a method of assembling an audio headset according to an embodiment of the present disclosure.

FIG. 6 is a flow diagram illustrating a method of assembling an audio headset incorporating a replaceable audio driver module and an accessible battery system according to an embodiment of the present disclosure. As described herein, the replaceable audio driver module in an embodiment may be easily and safely removed from or integrated within an the earcup assembly of a wired or wireless audio headset, which also allows for easy and safe removal and replacement of replaceable batteries of the accessible battery system and interchangeable use of the replaceable audio driver modules in both earcup assemblies of audio headsets and mobile speaker devices. FIG. 6 describes assembly of an audio headset incorporating the replaceable audio driver module in an embodiment.

At block 602, an audio driver module frame for a replaceable audio driver module may be formed of plastic or other suitable material for interchangeable operative coupling with an earcup cushion module and either an earcup sound chamber cover for an audio headset or a mobile speaker device bottom cover in an embodiment. The audio driver module frame in an embodiment may be made of plastic or other suitable material and include a magnetic mating strip fixed to an inner surface for operative coupling with a magnetic mating strip of an earcup cushion module. The frame may include a plurality of magnetic mating mounts fixed to its outer surface for operative coupling with a plurality of magnetic mating mounts of an earcup sound chamber cover or a mobile speaker device bottom cover. For example, in an embodiment described with reference to FIG. 3A, an audio driver module frame 341 for a replaceable audio driver module 340 may be formed of plastic or other suitable material for interchangeable operative coupling with an earcup cushion module 320 and either an earcup sound chamber cover 330 for an audio headset (e.g., 220 of FIG. 2) or a mobile speaker device bottom cover, as described in greater detail below with respect to FIG. 7. The audio driver module frame in an embodiment may include a plurality of magnetic mating mounts of magnets or ferromagnetic material formed in or disposed within the plastic for operative coupling with a plurality of magnetic mating mounts 334*a* and 334*b* formed on an earcup sound chamber cover 330 or a mobile speaker device bottom cover, as described in greater detail with respect to FIG. 7, below.

In another example embodiment described with respect to FIGS. 3B and 4A, the replaceable audio driver module 340 may include a magnetic mating strip formed onto, adhered to, or fastened to an inner surface of the audio driver module frame 341 for operative coupling with the magnetic mating strip 329 of the earcup cushion module 320. An audio driver module frame 441 for the replaceable audio driver module 440 may be formed to a size and shape for interchangeable operative coupling with an earcup cushion module and either an earcup sound chamber cover for an audio headset, or a mobile speaker device bottom cover of corresponding size to receive the replaceable audio driver module 440. The audio driver module frame 441 in an embodiment may include a magnetic mating strip 442 formed onto, adhered to, or fastened to an inner surface for operative coupling with a magnetic mating strip of an earcup cushion module 329.

In still another example embodiment described with respect to FIGS. 3A, 4B, and 5B, an audio driver module frame for a replaceable audio driver module may be formed for interchangeable operative coupling with an earcup cushion module 320 and either an earcup sound chamber cover 330 for an audio headset or a mobile speaker assembly bottom cover 590. The audio driver module frame 441 in an embodiment may include a plurality of magnetic mating mounts 448*a* and 448*b* formed onto, adhered to, or fastened to the outer surface for operative coupling with a plurality of magnetic mating mounts 334*a* and 334*b* of an earcup sound chamber cover 330 as well as a plurality of magnetic mating mounts 591 of a mobile speaker device as in FIG. 7, below.

An audio driver may be operatively coupled in an embodiment at block 604 to an audio actuator and to an audio actuator main printed circuit board (PCB) having a main PCB magnetic power connector for operative coupling with a magnetic power connector of a power PCB in either an earcup sound chamber cover or a mobile speaker device. For example, in an embodiment described with respect to FIGS. 3A and 3B, the replaceable audio driver module 340 may include an audio actuator main PCB magnetic power connector 347 on an audio actuator printed circuit board 346 mounted within the audio driver module frame 341, where the audio actuator main PCB magnetic power connector 347 is for operative coupling with a magnetic power connector 332 of a power PCB 331 for the accessible battery system in an earcup sound chamber cover 330. The audio actuator main PCB magnetic power connector 347 may also operatively couple with a magnetic power connector of a mobile speaker device, as described in greater detail below with respect to FIG. 7. In another example embodiment described with respect to FIGS. 3A, 4A, and 4B an audio driver 443 may be operatively coupled to an audio actuator 444 and to an actuator main printed circuit board (PCB) 446 formed within the audio driver module frame 441. The actuator main PCB 446 has a main PCB magnetic power connector 447 for operative coupling with a magnetic power connector 332 of a power PCB 331 for the accessible battery system 336 in either an earcup sound chamber cover 330 or a magnetic power connector 582*a* or 582*b* of a power PCB 583 in a mobile speaker device 550.

At block 606, the audio actuator and the actuator diaphragm may be disposed between the audio main PCB and the audio driver within the audio driver module frame in an embodiment. For example, in an embodiment described with reference to FIGS. 4A and 4B, the audio actuator 444 and the actuator diaphragm 445 may be disposed across the audio driver module frame 441 such that it will be between an audio main PCB 446 and the audio driver 443.

In an embodiment at block 608, the audio main PCB may be mounted to the audio driver module frame outer surface. For example, in an embodiment described with reference to FIG. 4B, the audio main PCB 446 may be mounted to the audio driver module frame 441 outer surface. The actuator main PCB 446 is electrically coupled to audio driver 443 and actuator 444 that further actuates the actuator diaphragm 445 to generate sound.

At block 610, an earcup cushion module may be formed in an embodiment by fixing an earcup cushion to an earcup cushion module mating collar having a magnetic mating strip for operative coupling with the magnetic mating strip fixed to the audio driver module frame. For example, in an embodiment described with respect to FIG. 3A, an earcup cushion module 320 may be formed in an embodiment by fixing an earcup cushion 327 to an earcup cushion module mating collar made of plastic or other suitable material. In another example embodiment described with respect to FIG. 3B, the earcup cushion module 320 may be formed by fixing an earcup cushion 327 to an earcup cushion module mating collar 326 made of plastic of other suitable material and having the magnetic mating strip 329 formed onto, adhered to, or fastened to the earcup cushion module mating collar 326.

A sound chamber cover may be formed in an embodiment at block 612 having magnetic mating mounts fixed to an inner surface for operative coupling with the plurality of magnetic mating mounts of the replaceable audio driver module. For example, in an embodiment described with reference to FIG. 3A, a sound chamber cover 330 may be formed of plastic or other suitable material having magnetic mating mounts 334*a* and 334*b* with magnets or ferromagnetic material formed onto, adhered to, or fastened to an inner surface of the sound chamber cover 330 for operative coupling with the plurality of magnetic mating mounts of the replaceable audio driver module 340.

At block 614, a power PCB of an accessible battery system for an audio headset may be operatively coupled in an embodiment to a replaceable battery and to a power PCB magnetic power connector for operative coupling with the audio actuator main PCB magnetic power connector of the replaceable audio driver module. For example, in an embodiment described with respect to FIGS. 3A, 3B, and 4B, a power PCB 331 of an accessible battery system 336 for an audio headset may be operatively coupled in an embodiment to a replaceable battery 333 and to a power PCB magnetic power connector 332 for operative coupling with the audio actuator main PCB 446 at the audio actuator main PCB magnetic power connector 447 of the replaceable audio driver module 340. The replaceable battery 333 is accessible by a user for removal or replacement by detaching the replaceable audio driver module 340 from the earcup sound chamber cover 330 to expose the replaceable battery 333 of the accessible battery system 336. This may be achieved by separating the plurality of magnetic mating mounts 334*a* and 334*b* from the detachably operatively coupled magnetic mating mounts of the replaceable audio driver module 340. The power PCB magnetic power connector 332 may receive power from the power PCB 331, via replaceable battery 333, and deliver such power to the replaceable audio driver module 340 via the power connector 347 of the replaceable audio driver module 340. The power PCB with magnetic power connector, and replaceable battery of an audio headset in an embodiment may be disposed within the sound chamber cover at block 616. For example, in an embodiment described with respect to FIG. 3A, the power PCB 331, magnetic power connector 332, and replaceable battery 333 of an audio headset may be disposed within the sound chamber cover 330.

At block 618, the sound chamber cover may be disposed within an earcup outer cover to form earcup outer cover module in an embodiment. The sound chamber cover in an embodiment may be operatively coupled to a headband connector post and a headband. For example, in an embodiment described with reference to FIG. 2, each of the sound chamber covers within the first and second earcup assemblies 221 and 225 may be disposed within an earcup outer cover 227 and 228 to form earcup outer cover modules. Each of the sound chamber covers within first and second earcup assemblies 221 and 225 in an embodiment may be operatively coupled to a headband connector posts 222 and 224, respectively. In another example embodiment described with respect to FIG. 3A or 3B, the sound chamber cover 330 may be disposed within an earcup outer cover 328 to form an earcup outer cover module 399. The sound chamber cover 330 in an embodiment may be operatively coupled to a headband connector post 324.

The replaceable audio driver module may be operatively coupled to the sound chamber cover and earcup cushion module in an embodiment at block 620 to form a first earcup assembly. The replaceable audio driver module magnetic mounts may detachably and magnetically operatively couple with the earcup sound chamber cover magnetic mounts, and the replaceable audio driver module magnetic strips may detachably and magnetically operatively couple with the earcup cushion module magnetic strips in an embodiment. For example, in an embodiment described with reference to FIG. 2, a replaceable audio driver module and replaceable batteries of the accessible battery system may be housed within each of the first and second earcup assemblies 221 and 225, respectively. The replaceable audio driver module may be operatively coupled to a sound chamber cover and an earcup cushion module within an outer earcup cover in an embodiment to form a first earcup assembly 221 and a second earcup assembly 225. In another example embodiment described with reference to FIG. 3A, the replaceable audio driver module 340 may be operatively coupled to the sound chamber cover 330 and earcup cushion module 320 to form a first earcup assembly. The audio driver module magnetic mounts may detachably and magnetically operatively couple with the earcup sound chamber cover magnetic mounts 334*a* and 334*b* in an embodiment.

In yet another example embodiment described with respect to FIGS. 2, 3B and 4A, the replaceable audio driver module 340 may be operatively coupled to the sound chamber cover 330 disposed within the outer earcup cover 328 and earcup cushion module 320 to form a first earcup assembly 221. The audio driver module magnetic strip 442 may detachably and magnetically operatively couple with the earcup cushion module 320 magnetic strip 329 in an embodiment. In still another example embodiment described with respect to FIGS. 2, 3A, and 4B, the replaceable audio driver module 440 may be operatively coupled to the sound chamber cover 330 and earcup cushion module 320 to form a first earcup assembly 221. The replaceable audio driver module 440 magnetic mounts 448*a* and 448*b* may detachably and magnetically operatively couple with the earcup sound chamber cover magnetic mounts 334*a* and 334*b* in an embodiment.

At block 622, a mating collar of the earcup cushion module may detachably operatively couple with a plurality of collar openings in the replaceable audio driver module in an embodiment. For example, in an embodiment described with respect to FIG. 3B, the mating collar 327 of the earcup cushion module 320 may detachably operatively couple with a plurality of collar openings in the replaceable audio driver module 340. More specifically, the mating collar 327 may include a plurality of deformable tabs 327*a*, such as plastic tabs that may each insert within a collar opening of the replaceable audio driver module 340. Upon insertion of each of the tabs 337*a* within the openings in the replaceable audio driver module 340, the tabs may lock into place to hold the replaceable audio driver module 340 in contact with the earcup cushion module 320. In order to detach the replaceable audio driver module 340 from the earcup cushion module 320 in an embodiment, the user may detach the earcup outer cover assembly 399 from the replaceable audio driver module 340 and deform the collar tabs 337*a* such that they may pass through the openings of the replaceable audio driver module 340. The user may then detach the magnetic strip 329 from the audio driver module magnetic strip. In another example embodiment described with reference to FIGS. 3B and 4A, a mating collar 327 of the earcup cushion module 320 may detachably operatively couple with a plurality of collar openings 449 in the replaceable audio driver module 440.

The first earcup assembly may be operatively coupled to a second ear cup assembly in an embodiment at block 624, via a headband, to form an audio headset. For example, in an embodiment described with reference to FIG. 2, the first earcup assembly 221 may be operatively coupled to the second ear cup assembly 225 in an embodiment, via the headband 223, to form the audio headset 220. In such a way, the replaceable audio driver module in an embodiment may be easily and safely integrated within or removed from an earcup assembly, which also allows for easy and safe removal and replacement of replaceable batteries and interchangeable use of the replaceable audio driver modules in both the earcup assemblies and the mobile speaker devices. The method for assembling an audio headset incorporating a replaceable audio driver module and accessible battery system may then end.

Figure 7:
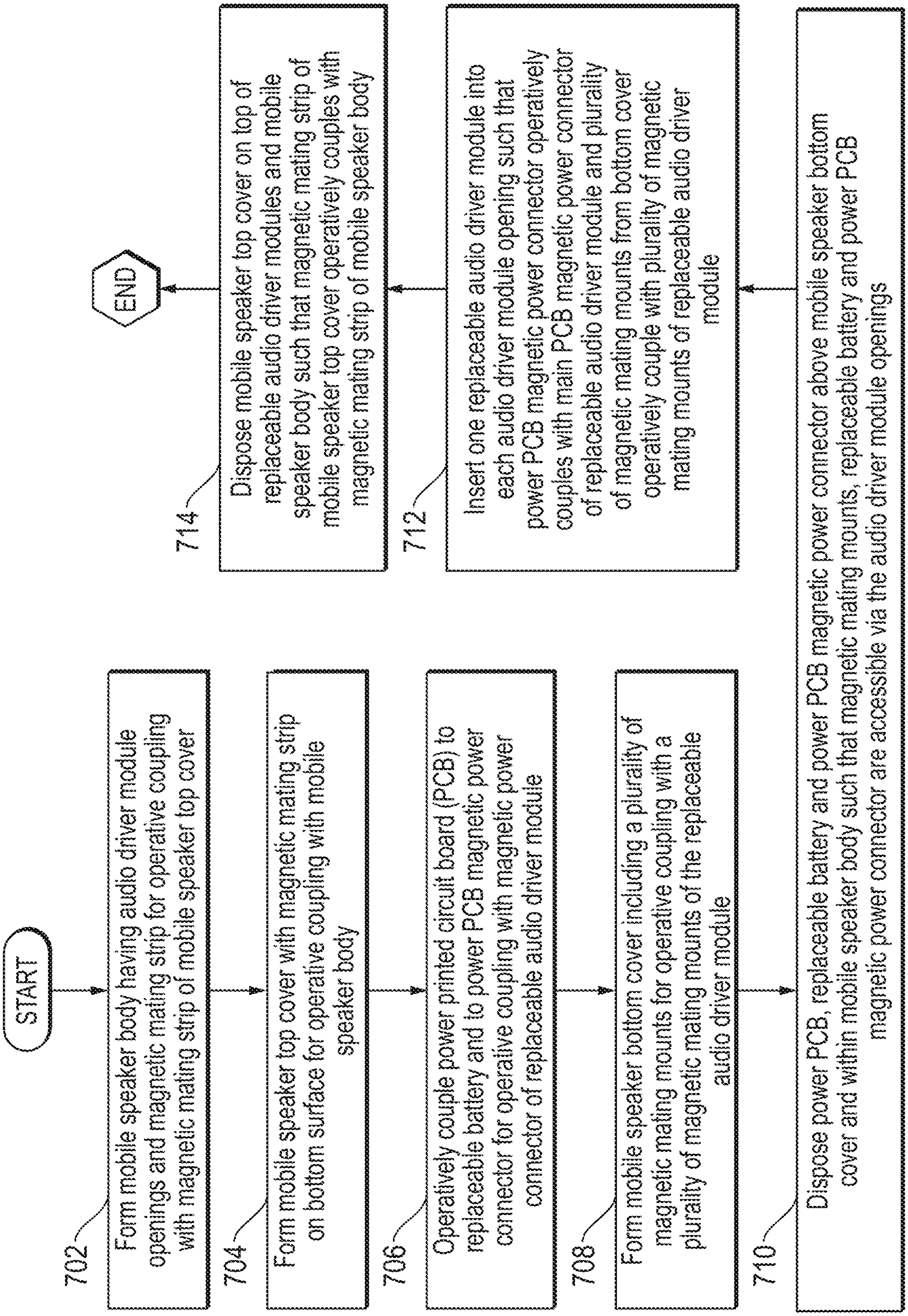
FIG. 7 is a flow diagram illustrating a method of assembling a mobile audio speaker device according to an embodiment of the present disclosure.

FIG. 7 is a flow diagram illustrating a method of assembling a mobile audio speaker device incorporating a replaceable audio driver module and having an accessible battery system according to an embodiment of the present disclosure. As described herein, the replaceable audio driver module in an embodiment may be easily and safely removed from or integrated within a mobile speaker device, which also allows for easy and safe removal and replacement of replaceable batteries and interchangeable use of the replaceable audio driver modules in both earcup assemblies and mobile speaker devices. FIG. 7 describes assembly of mobile speaker device incorporating the replaceable audio driver module in an embodiment.

At block 702, a mobile speaker body for a mobile speaker device may be formed of plastic or other suitable material in an embodiment to include an audio driver module opening and a magnetic mating strip for operative coupling with a magnetic mating strip of a mobile speaker top cover. For example, in embodiments described with respect to FIGS. 5A and 5B, a mobile speaker body 570 for a mobile speaker device 550 may be formed of plastic or another suitable material in an embodiment for enclosing one or more replaceable audio driver modules 540*a* and 540*b*. The mobile speaker body 570 may include an audio driver module opening 572*a* or 572*b* and a magnetic mating strip 573 of a magnetic or ferromagnetic material for operative coupling with a magnetic mating strip 563 of a mobile speaker top cover 561.

A mobile speaker top cover may be formed in an embodiment at block 704 to include a magnetic mating strip on a bottom surface of a speaker top cover frame 562 for operative coupling with the mobile speaker body 570. Further, the mobile speaker top cover 561 may be formed with the speaker cover frame 562 having a mesh, fabric, or other top cover material 564 on or across the speaker cover frame 562 that permits audio sounds to pass through in embodiments herein. A frame 562 of mobile speaker top cover 561 may be formed of plastic or other suitable material in an embodiment and include a magnetic mating strip 563 on a bottom surface for operative coupling with the mobile speaker body 570.

At block 706, a power printed circuit board (PCB) of the mobile speaker device may be operatively coupled to a replaceable battery and to a power PCB magnetic power connector for operative coupling with a magnetic power connector of the replaceable audio driver module. For example, in embodiments described with respect to FIGS. 4B and 5B, a power printed circuit board (PCB) 583 of the mobile speaker device 550 may be operatively coupled to a replaceable battery 581*a* or 581*b* and to a power PCB magnetic power connector 582*a* or 582*b* of an accessible battery system for operative coupling with a magnetic power connector 447 of the replaceable audio driver module 440, 540*a* or 540*b*.

A mobile speaker bottom cover may be formed in an embodiment at block 708 to include a plurality of magnetic mating mounts for operative coupling with a plurality of magnetic mating mounts of the replaceable audio driver module. For example, in embodiments described with respect to FIGS. 4B and 5B, a mobile speaker bottom cover 590 may be formed of plastic or other suitable material to include a plurality of magnetic mating mounts 591 for operative coupling with a plurality of magnetic mating mounts 448*a* and 448*b* of the replaceable audio driver module 440, 540*a* or 540*b*. Either or both magnetic mating mounts 448*a* and 448*b* may be magnets or ferromagnetic material formed into, adhered to, or fastened to plastic material of the mobile speaker bottom cover 590.

At block 710, the power PCB, replaceable battery, and power PCB magnetic power connector may be disposed above the mobile speaker bottom cover and within the mobile speaker body such that the magnetic mating mounts, replaceable battery and power PCB magnetic power connector are accessible via the audio driver module opening. For example, in an embodiment described with respect to FIG. 5B, the power PCB 583, replaceable batteries 581*a* and 581*b*, and power PCB magnetic power connectors 582*a* and 582*b* may be disposed above the mobile speaker bottom cover 590 and within the mobile speaker body 570 such that the magnetic mating mounts 591, replaceable batteries 581*a* and 581*b* and power PCB magnetic power connectors 582*a* and 582*b* are accessible via the audio driver module openings 571*a* and 571*b*, respectively. This provides for an accessible battery system for the mobile speaker device 550.

One replaceable audio driver module in an embodiment at block 712 may be inserted into each audio driver module opening within the mobile speaker body. The replaceable audio driver module(s) may be inserted in an embodiment such that the power PCB magnetic power connector operatively couples with the audio actuator main PCB magnetic power connector of the replaceable audio driver module and the plurality of magnetic mating mounts from the bottom cover operatively couple with the plurality of magnet mating mounts of the replaceable audio driver module. For example, in embodiments described with respect to FIGS. 5A and 5B, one of a plurality of replaceable audio driver modules 540*a* and 540*b* in an embodiment may be inserted into each audio driver module opening 572*a* and 572*b*, respectively, within the mobile speaker body 570. In another example embodiment described with respect to FIGS. 4B and 5B, the replaceable audio driver module(s) 540*a* and 540*b* may be inserted in an embodiment such that the power PCB magnetic power connectors 582*a* and 582*b* operatively couple with the main PCB magnetic power connectors 447 of the replaceable audio driver modules 540*a* and 540*b*, respectively, and the plurality of magnetic mating mounts 591 from the bottom cover 590 operatively couple with the plurality of magnet mating mounts 448*a* and 448*b* of the replaceable audio driver modules 540*a* and 540*b*.

At block 714, the mobile speaker top cover in an embodiment may be disposed on top of the replaceable audio driver module(s) and the mobile speaker body such that the magnetic mating strip of the mobile speaker top cover operatively couples with the magnetic mating strip of the mobile speaker body to enclose the replaceable audio driver module within the mobile speaker device. For example, in embodiments described with respect to FIGS. 5A and 5B, the mobile speaker top cover 561 in an embodiment may be disposed on top of the replaceable audio driver module(s) 540*a* and 540*b* and the mobile speaker body 570 to enclose the replaceable audio driver module 540*a* and 540*b* within the mobile speaker device 550, such that the magnetic mating strip 563 of the mobile speaker top cover 561 operatively couples with the magnetic mating strip 573 of the mobile speaker body 570.

In such a way, the replaceable audio driver module in an embodiment of the present disclosure may be easily and safely integrated within or removed from a mobile speaker device, which also allows for easy and safe removal and replacement of replaceable batteries and interchangeable use of the replaceable audio driver modules in both the earcup assemblies of an audio headset and the mobile speaker devices. The method for assembling a mobile audio speaker device incorporating a replaceable audio driver module with an accessible battery system may then end.

The blocks of the flow diagram of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A replaceable audio driver module and an accessible battery system for an audio headset or a mobile speaker device comprising:

an audio driver module frame with a first magnetic mating strip disposed on an audio driver module frame inner surface for detachable operative coupling with a second magnetic mating strip of an earcup cushion module and a first plurality of magnetic mating mounts disposed on an audio driver module frame outer surface for detachable operative coupling with a second plurality of magnetic mating mounts of an earcup sound chamber cover of the audio headset or a mobile speaker device bottom cover of the mobile speaker device;

an actuator diaphragm operatively coupled across the audio driver module frame and an actuator main printed circuit board (PCB) that is operatively coupled to an audio driver, and an audio actuator in the audio driver module frame;

an actuator main PCB magnetic power connector on the actuator main PCB operatively coupled with a power PCB and a replaceable battery within the earcup sound chamber cover or the mobile speaker device; and the actuator main PCB magnetic power connector for receiving power from the power PCB and the replaceable battery within the earcup sound chamber cover or the mobile speaker device to operate the audio actuator and move the actuator diaphragm to generate audible sound.

2. The replaceable audio driver module and the accessible battery system of claim 1 further comprising:

the replaceable battery operatively coupled to the power PCB having a power PCB magnetic power connector for detachable operative coupling with the actuator main PCB magnetic power connector for an accessible battery system via removal of the replaceable audio driver module.

3. The replaceable audio driver module and the accessible battery system of claim 1 further comprising:

the power PCB disposed within the earcup sound chamber cover such that the replaceable battery supplying power to the power PCB is accessible by the user upon detaching by the user of the first plurality of magnetic mating mounts from the second plurality of magnetic mating mounts.

4. The replaceable audio driver module and the accessible battery system of claim 1 further comprising:

an earcup cushion detachably and operatively coupled to the replaceable audio driver module via a first magnetic mating strip on the earcup cushion and a second magnetic mating strip on the audio driver module frame to form a first earcup assembly operatively coupled to a second earcup assembly via a headband of the audio headset.

5. The replaceable audio driver module and the accessible battery system of claim 1 further comprising:

the replaceable audio driver module removably inserted within an audio driver module opening of a mobile speaker device body having the first magnetic mating mounts on the audio driver module frame for detachable and operative coupling with the second magnetic mating mounts of a mobile speaker device bottom cover to operatively couple the replaceable audio driver module within the mobile speaker device.

6. The replaceable audio driver module and the accessible battery system of claim 1 further comprising:

the replaceable battery of the mobile speaker device operatively coupled to the power PCB and housed between the replaceable audio driver module and the mobile speaker device bottom cover such that the replaceable battery is accessible to a user via an audio driver module opening within a mobile speaker device body upon detaching of the first plurality of magnetic mating mounts from the second plurality of magnetic mating mounts.

7. The replaceable audio driver module and the accessible battery system of claim 1, wherein the audio actuator is a piezoelectric actuator.

* * * * *